Nov. 21, 1933.  A. F. MASURY  1,936,062
HEATING MEANS FOR REFRIGERATING BODIES
Filed April 13, 1933    2 Sheets-Sheet 1

Nov. 21, 1933.  A. F. MASURY  1,936,062
HEATING MEANS FOR REFRIGERATING BODIES
Filed April 13, 1933   2 Sheets-Sheet 2

INVENTOR
Alfred F. Masury,
BY
Redding, Greeley, O'Shea & Campbell
HIS ATTORNEYS

Patented Nov. 21, 1933

1,936,062

UNITED STATES PATENT OFFICE 1,936,062

HEATING MEANS FOR REFRIGERATING BODIES

Alfred F. Masury, New York, N. Y., assignor to International Motor Company, New York, N. Y., a corporation of Delaware Application April 13, 1933. Serial No. 665,886

3 Claims. (Cl. 257—7)

The present invention relates to vehicle bodies and embodies, more specifically, a body construction of such character as to facilitate the maintenance of a predetermined temperature within the interior thereof, regardless of exterior temperature and humidity conditions, the construction further including means for heating the interior of the body in accordance with predetermined conditions.

The transportation of certain commodities requires a control of the heating of the commodities, the required temperatures varying in accordance with the substances carried. Certain perishable products, requiring predetermined temperatures, are frequently transported under weather conditions such that the exterior temperature of the body is greatly below the lowest permissible temperature under which the products can favorably exist. As an illustration, bananas and other fruits must be maintained at moderately cool temperatures but should not be frozen or maintained below predetermined temperatures. Where such commodities are transported in winter time in northern climates, the weather conditions encountered are frequently such that the temperature is below freezing and even at times below zero. In order that a refrigerating body may be provided to accommodate changes in weather conditions wherein the temperature outside the body is much less than is desired within the body, the present invention has been designed and an object thereof is to provide a refrigerating body with a means to effect the heating thereof.

A further object of the invention is to provide a body of the above character with a heating means which not only maintains the temperature within the body within a predetermined temperature range but additionally affords a means for circulating the air within the body to prevent stagnation thereof.

Further objects, not specifically enumerated thereof, will be apparent as the invention is described in greater detail in connection with the accompanying drawings, wherein.

Figure 1:
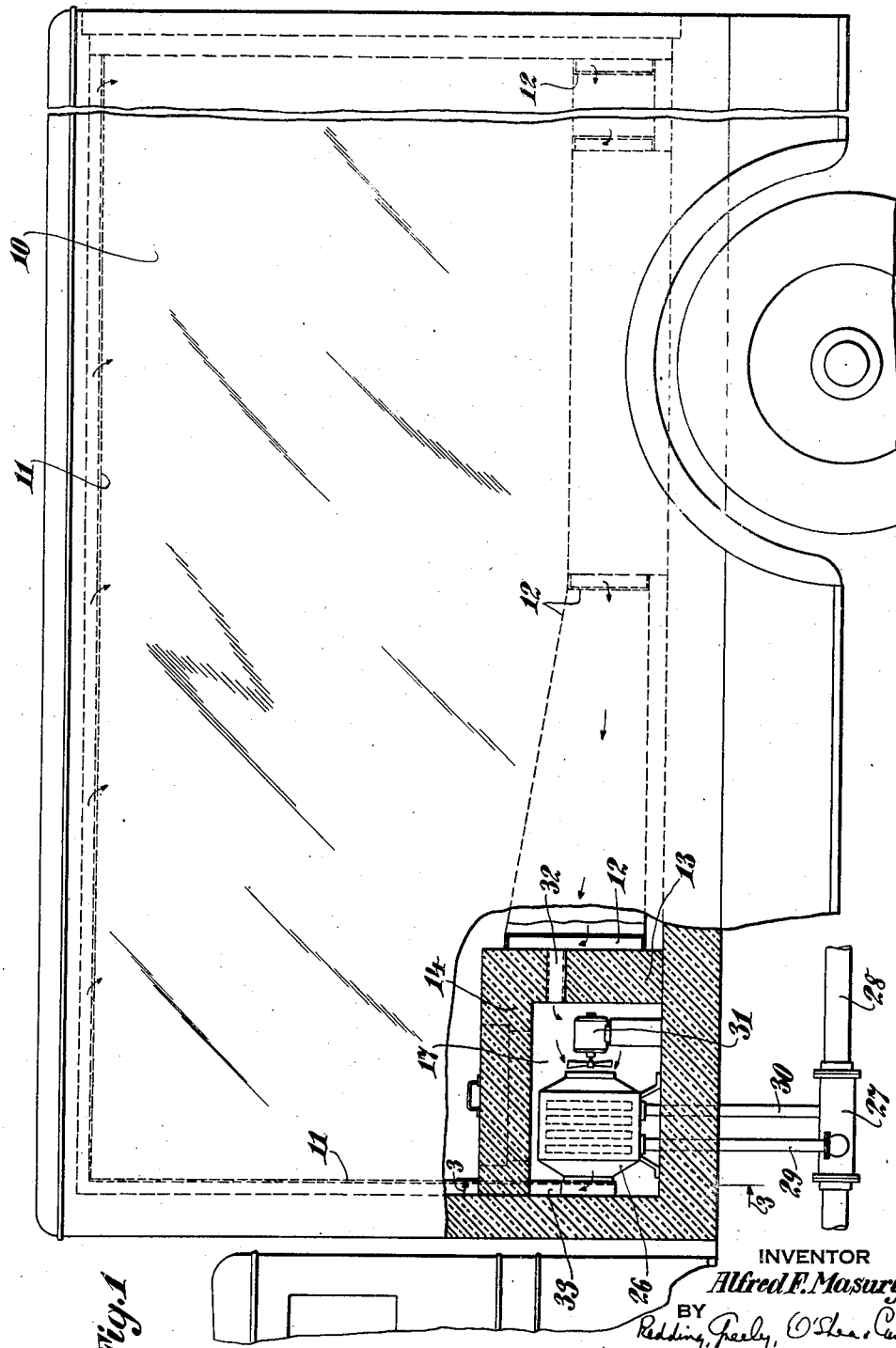
Figure 1 is a view in side elevation showing a refrigerating body provided with a heating means constructed in accordance with the present invention.
Figure 2:
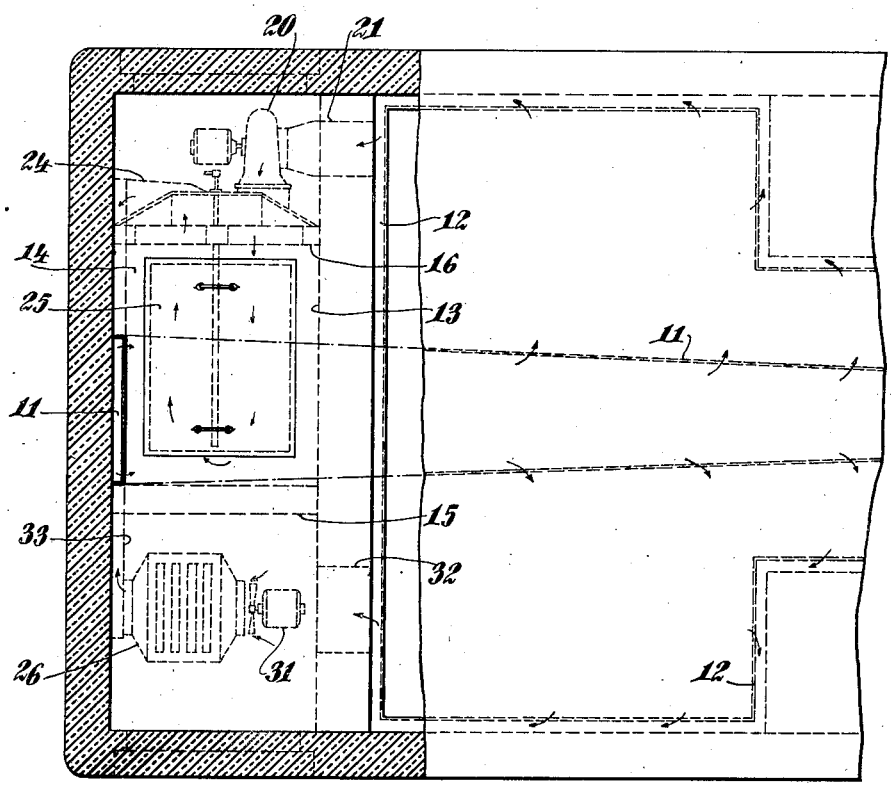
Figure 2 is a segmental plan view, partly broken away and in section showing the body of Figure 1.
Figure 3:
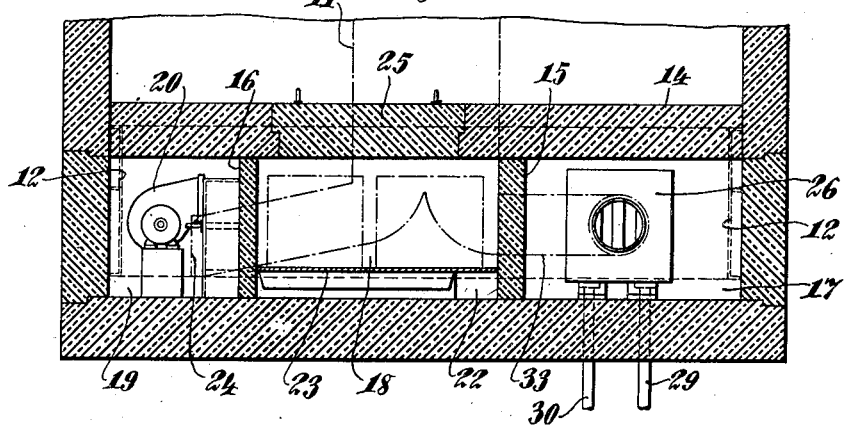
Figure 3 is a view in section, taken on line 3—3 of Figure 1, and looking in the direction of the arrows.

In the drawings, a refrigerating body is shown at 10 and formed with a discharge duct 11 and inlet ducts 12. The discharge duct 11 is formed adjacent the top of the interior of the body while the inlet ducts 12 are formed at the sides of the body adjacent the bottom thereof.

Forwardly of the interior of the body a partition member 13 is provided, the partition member serving to form a plurality of compartments which are closed by means of a top 14. Longitudinal partitions 15 and 16 divide the compartment into three chambers 17, 18, and 19. Within the chamber 19, a fan 20 is provided, the fan serving to circulate air from the inlet ducts 12 through a duct 21 and into a heat interchange chamber 22 isolated from the compartment 18 by means of a heat interchange plate 23. From the chamber 22, the air is circulated through a duct 24 to the discharge duct 11. A suitable refrigerant may be placed within the chamber 18 through a door 25, formed in the top 14 of the compartment. The foregoing refrigerating system may follow the construction shown in the copending application of Post and Hanshew Ser. No. 627,310 filed August 3, 1932 for Refrigerating mechanism.

Within the chamber 17, a radiator 26 is provided, the radiator being formed with a closed fluid circulating chamber communicating with a jacket 27 upon the exhaust pipe 28 of the vehicle. Pipes 29 and 30 afford such communication and thus the fluid within the closed system is heated by the exhaust gases and affords a source of heat for the interior of the body. A circulating fan 31 is suitably positioned to direct air through the radiator 26 taking it from the ducts 12 through a passage 32. From the radiator the heated air flows into the discharge duct 11 by means of a passage 33. In this fashion, the air within the body is continuously circulated and is either cooled by means of the refrigerating mechanism provided in chambers 18 and 19, or warmed by the heating mechanism in chamber 17.

While the invention has been described with specific reference to the accompanying drawings, it is not to be limited, save as defined in the appended claims.

I claim as my invention:

1. An insulated vehicle body having inlet and discharge ducts formed therein, means to circulate air through the ducts, means to cool the air, a radiator for heating the air, separate passages from the inlet duct to the cooling and heating means, separate passages from the cooling and heating means to the discharge duct, a jacket on the exhaust pipe of the vehicle, and connections for circulating water for heating purposes between said exhaust pipe jacket and the radiator.

2. An insulated vehicle body having inlet and discharge ducts formed therein, and adapted to have air circulate therethrough, means to cool the air, a radiator for heating the air, separate passages from the inlet duct to the cooling and heating means, separate passages from the cooling and heating means to the discharge duct, means to direct air through the passages selectively, a jacket on the exhaust pipe of the vehicle, and connections for circulating water for heating purposes between said exhaust pipe jacket and said radiator.

3. An insulated vehicle body having inlet and discharge ducts formed therein, means to circulate air through the ducts, means to cool the air, a radiator for heating the air, separate passages from the inlet duct to the cooling and heating means, separate passages from the cooling and heating means to the discharge duct, fans adjacent the cooling means and radiator to direct air therethrough, a jacket on the exhaust pipe of the vehicle, and connections for circulating water for heating purposes between said exhaust pipe jacket and said radiator.

ALFRED F. MASURY.